United States Patent [19]
Womack et al.

[11] Patent Number: 5,640,476
[45] Date of Patent: Jun. 17, 1997

[54] GUIDE SLEEVE FOR FIBER OPTIC CABLE

[75] Inventors: Michele Renè Womack, Carrollton; Sean Michael Kerr, Trophy Club; Michael de Jong, Fort Worth, all of Tex.

[73] Assignee: Siecor Corporation, Hickory, N.C.

[21] Appl. No.: 502,334

[22] Filed: Jul. 14, 1995

[51] Int. Cl.⁶ .................................................. G02B 6/44
[52] U.S. Cl. ............................ 385/86; 385/76; 385/87
[58] Field of Search .............................. 385/86, 87, 100, 385/83, 84, 70, 76

[56] References Cited

U.S. PATENT DOCUMENTS

| | | | |
|---|---|---|---|
| 5,347,603 | 9/1994 | Belenkiy et al. | 385/86 |
| 5,461,690 | 10/1995 | Lampert | 385/86 X |

*Primary Examiner*—Phan T. H. Palmer
*Attorney, Agent, or Firm*—Wesley T. Noah

[57] ABSTRACT

A guide sleeve is provided for guiding a portion of a fiber optic cable through a turn and insuring that the turn radius of such portion of the cable does not decrease below the minimum bend radius of the cable. The guide comprises a curved sleeve that has a radius of curvature not less than the minimum bend radius of the fiber optic cable. The sleeve has an interior surface that defines a passageway, and the sleeve defines a slot that communicates with the passageway and extends the entire length of the sleeve such that the sleeve has an open cross-section along the entire length of the sleeve. The slot is configured to allow insertion of a length of a cable through the slot and into the passageway. The slot allows the guide to be removably installed on a cable that already has connectors and boots installed on each end of the cable without affecting the integrity of the connector/boot connection.

18 Claims, 2 Drawing Sheets

GUIDE SLEEVE FOR FIBER OPTIC CABLE

TECHNICAL FIELD OF THE INVENTION

This invention relates to a guide sleeve that can be removably attached to a fiber optic cable to prevent the fiber optic cable from bending at a radius below the minimum bend radius for the fiber optic cable. In one aspect, the invention relates to a guide sleeve that is capable of being removably installed on a fiber optic cable that already has a connector/boot assembly permanently installed at each end without affecting the integrity of such connector/boot assemblies.

BACKGROUND OF THE INVENTION

As is well known in fiber optics, bending a fiber optic cable too tightly can lead to a reduction in the signal transmission quality of the cable. However, it is necessary to be able to bend fiber optic cables around corners and other obstacles in order to route the cables to and from equipment such as computers, connector panels, junctions boxes, etc. Accordingly, fiber optic cables are evaluated to determine a minimum bend radius. As long as a fiber optic cable is bent at a radius that is equal to or greater than the minimum bend radius, there should be no reduction in the transmission quality of the cable. However, if a fiber optic cable is bent at a radius below the minimum bend radius determined for such cable, there is a potential for a reduction of the quality of signal transmission through the bend.

Small diameter fiber optic cables are typically terminated at each end in a connector. The process of terminating the fiber optic cable in a connector is commonly referred to as "connectorization." A connectorized cable is one that has each end terminated in a connector. The point where a fiber optic cable extends into a connector joined on the end of the cable is an especially susceptible point of the cable bending below the minimum bend radius of the cable. To prevent this, it is well known to install reinforcing boots during connectorization that extend out from the connector and encase a length of the cable extending from the connector. Such boots are permanently installed during connectorization. These boots are flexible enough to allow bending of the cable as it extends from the rigid connector yet they are intended to provide enough reinforcement to prevent severe kinking of the cable at the cable/connector junction. However, there are problems in relying merely on reinforcing boots to prevent excessive bending of the fiber optic cable. For example, hundreds of fiber optic cables are commonly routed through and connected in connector panels or junction boxes with limited space. The connectors of such fiber optic cables are commonly inserted into horizontally oriented connectors that are arranged in a vertical panel in the junction box. The cables are routed in a direction perpendicular to their connector. The door of such junction boxes is also vertical and typically closes in a plane parallel to the panel of connectors. The space between the closed door and the panel of connectors is desired to be as small as possible; however, if the space is too small, the door will excessively bend the boot encased portion of the cable when it is closed.

To prevent such excessive bending of flexible boots, it is known to have right angle boots that are more rigid than the typical straight boot. However, these right angle boots are also permanently installed with the connector and fiber optic cable during connectorization. Such permanence requires that a user stock a supply of each different type of boot. Furthermore, the boot is not removable should a right angle turn no longer be needed.

Thus a need exists for a separate guide that can be removably installed to a connectorized fiber optic cable to guide the boot encased portion of the fiber optic cable through a curve away from its connector and insure that the cable will not be excessively bent inside a crowded junction box or other environment. Additionally, such a guide needs to be removably installable without affecting the integrity of the connector/boot assemblies of the connectorized cable.

In another example, cables are commonly routed through turns at a point away from the cable's connectors. The point where a cable will need to be routed through a turn is not known until a connectorized cable is being installed. Therefore a need exists for a guide that can be removably installed on a connectorized cable and then moved along the cable to the desired location where the guide will route a length of the cable through a turn and insure that the cable will not be excessively bent at such location.

SUMMARY OF THE INVENTION

The present invention, in one aspect, provides a fiber optic cable guide for removable placement on at least one fiber optic cable. The at least one fiber optic cable has a minimum bend radius. The fiber optic cable guide comprises a sleeve that is at least partially curved along its length with a radius of curvature not less than the minimum bend radius of the at least one fiber optic cable. The sleeve has a first end and a second end and an interior surface that generally defines a passageway extending from the first end to the second end. The sleeve defines a slot that communicates with the passageway and extends from the first end to the second end such that the sleeve has an open cross-section along the entire length of the sleeve. The slot is configured to allow removable insertion of the at least one cable through the slot to be disposed in the passageway.

In a further aspect of the present invention, the cross-section of the passageway of the sleeve increases toward the first end of the sleeve so that the first end of the sleeve can be pressed over at least a portion of a reinforcing boot on the cable.

In another aspect of the invention, a method is provided for routing at least one fiber optic cable through a curve. The method comprises placing a length of the at least one cable in a curved guide sleeve as just described and then sliding the guide along the at least one cable to the desired location.

In another aspect of the present invention, a guide and connectorized cable assembly is provided where a portion of the cable is removably disposed in a passageway defined through a guide sleeve.

The present invention provides for the guiding of a cable through a turn to insure that the cable is not excessively bent at such turn. The guide of the present invention can be removably installed to a connectorized cable without affecting the integrity of the connector/boot/cable assembly. Additionally, the guide can be repeatedly removed and reinstalled to a connectorized cable as needed.

DETAILED DESCRIPTION

Figure 1:
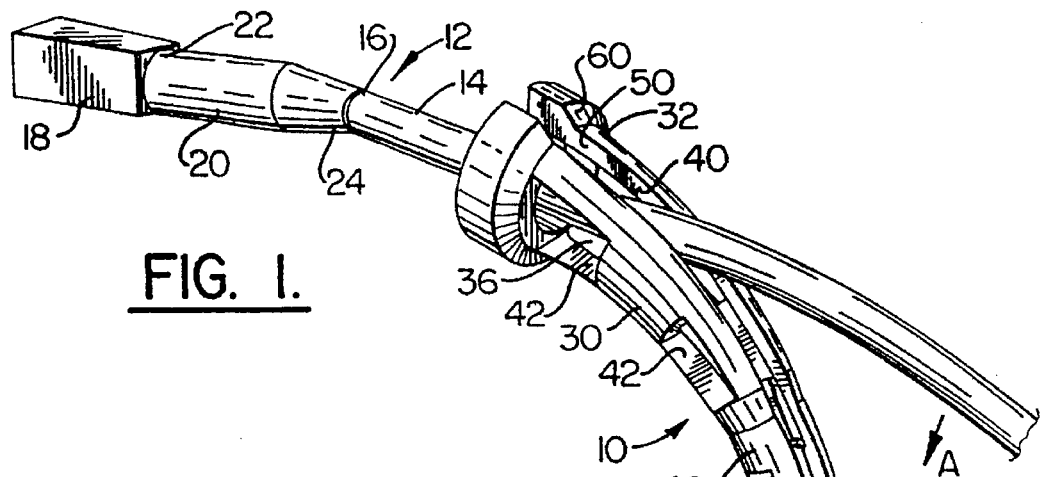
FIG. 1 is a perspective view of the preferred embodiment of the guide of the present invention partially installed on a connectorized cable.

With reference to FIGS. 1–4, the preferred embodiment of guide 10 of the present invention is shown being installed onto fiber optic cable 12 in an example application for the present invention. In this example application, connectorized fiber optic cable 12 has cable portion 14 with first end 16 terminating in connector plug 18. Cable portion 14 typically has a constant outer diameter between 2.25 to 3 mm. Connectorized cable 12 also has reinforcing boot 20 extending from connector plug 18 and encasing a length of first end 16 of cable portion 14. Boot 20 has first boot end 22 attached to connector plug 18 and second boot end 24 opposite thereto. Typically, boot 20 has an outer diameter that decreases toward second boot end 24. Boot 20 is flexible enough to allow curving of the boot 20. Fiber optic cable 12 has a minimum bend radius which is defined as the radius below which the cable should not be bent to insure proper signal transmission.

Guide 10 comprises curved sleeve 30 that has a radius of curvature not less than the minimum bend radius of cable 12. Sleeve 30 has first end 32 and second end 34 and defines passageway 36 that extends from first end 32 to second end 34. Passageway 36 in the preferred embodiment turns through a 90 degree turn from first end 32 to second end 34. Sleeve 30 has wall 40 which defines a plurality of cut-outs 42 which provide windows for viewing any identifying marks or colors on cable 12. Sleeve 30 has interior surface 44 and exterior surface 46.

Sleeve 30 defines slot 50 extending from first end 32 to second end 34 such that sleeve 30 has an open cross-section along its entire extent. Slot 50 runs generally parallel with passageway 36 with the exception of turn 52 in the circumferential direction. After turn 52, slot 50 then extends to second end 34. Slot 50 is wide enough to allow insertion of a length of cable portion 14 through slot 50 to be disposed in passageway 36. Slot 50 is wider at turn 52 to allow placement of a length of cable portion 14 around turn 52 and into passageway 36. With the exception of turn 52, sleeve 30 generally has a C-shaped cross-section. Turn 52 also creates catch portion 56 which can be seen in FIGS. 1, 2 and 4 to act as a catch to prevent unintentional egress of cable portion 14 from passageway 36. When it is desired to remove sleeve 30 from cable portion 14, cable portion is flexible enough that it can be manipulated around catch portion 56, through turn 52 and pulled out through slot 50.

Passageway 36 has a generally circular cross-section in the preferred embodiment with a diameter that increases toward first end 32 of sleeve 30 sufficiently corresponding to the change in outer diameter of boot 20 such that first end 32 of sleeve 30 can be pressed over second boot end 24 of boot 20 with a friction fit. The minimum diameter of passageway 36 is preferably large enough to allow ready sliding of cable portion 14 through passageway 36. As boot 20 is pressed into passageway 36, slot 50 allows wall 40 of sleeve 30 to flex and expand passageway 36 whereby interior surface 44 of sleeve 30 grips boot 20.

Wall 40 of sleeve 30 broadens at first end 32 to create outwardly stepped shoulder 60. Shoulder 60 provides a surface for an installer's fingers to grip sleeve 30 and manually press first end 32 of sleeve 30 over boot 20. First end 32 of sleeve 30 also has end face 62 which provides a surface for pulling sleeve 30 out of frictional engagement with boot 20. Cut-outs 42 provide additional gripping surfaces for installation and removal of sleeve 30.

Figure 2:
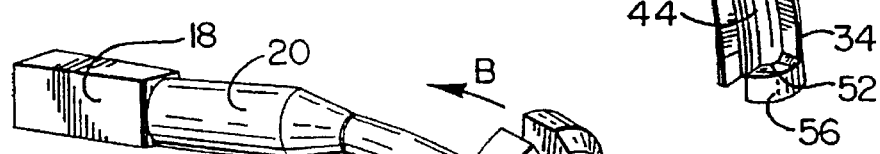
FIG. 2 is a perspective of the guide of FIG. 1 with the cable completely disposed within the guide.
Figure 3:
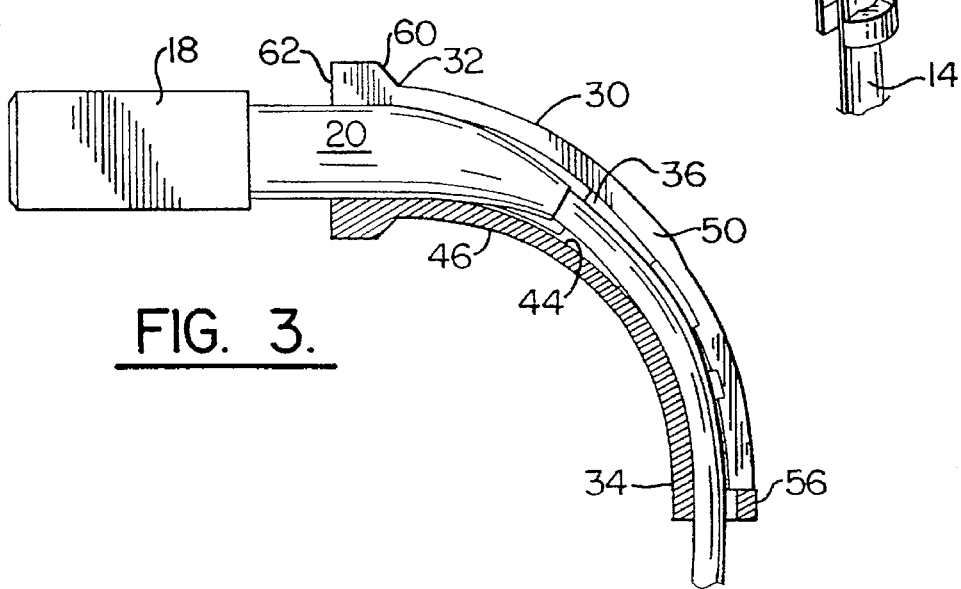
FIG. 3 is a longitudinal cross-section of the guide of FIG. 1 with a connectorized cable shown in side view installed therein.
Figure 4:
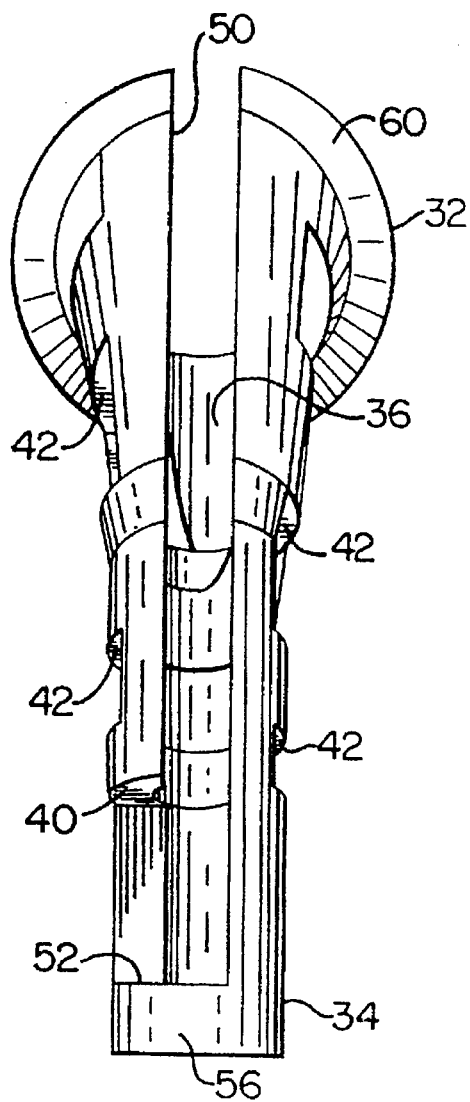
FIG. 4 is an end view of the guide of FIG. 1.

One aspect of the present invention is the method of routing a fiber optic cable through a turn with a radius that is not less than the minimum bend radius of the fiber optic cable. This method generally corresponds to the use of guide 10 which alone is one aspect of the present invention. Specifically, in operation of the preferred embodiment in the example application of FIGS. 1–4, one of the advantages of guide 10 of the present invention is that it can be readily mounted on a connectorized cable without affecting the integrity of the attachment of boot 20. For example, there is no need to separate the connector and boot connection to install the guide of the present invention. In fact, boot 20 of connectorized cable 12 does not have to be moved at all because the guide of the present invention is a separate piece that can be dimensioned to fit over an existing boot on a cable. Any readily accessible length of cable portion 14 can be inserted through slot 50 of sleeve 30 to dispose the length of cable portion 14 in passageway 36. FIG. 1 illustrates a length of cable portion partially inserted into sleeve 30. The cable portion is inserted in the direction of arrow A through slot 50. Once the length of cable portion 14 is disposed in passageway 36 as shown in FIG. 2, sleeve 30 can be readily slid along cable portion 14 and located at the desired position. If the desired position is at boot 20 of cable 12, first end 32 of sleeve 30 is readily pressed in the direction of arrow B shown in FIG. 2 until it is fit over second end 24 of boot 20 as shown in FIG. 3. As second end 24 of boot 20 is inserted into passageway 36 it flexes to follow the curve of passageway 36. Thus guide 10 is installed on the smaller diameter cable portion 14 and then slid into place over second end 24 of boot 20 to insure that a portion of boot 20 and cable portion 14 is guided through a turn with a radius not less than the minimum bend radius of cable 12.

Another aspect of the present invention is the combination of guide 10 with a fiber optic cable as shown in either FIG. 2 or 3. It should be understood that such combination is not limited to the guide in place over at least a portion of the boot but includes location of the guide at any point along cable 12.

In the preferred embodiment, guide 10 is injection molded of polycarbonate. This process provides a fairly rigid sleeve 30; however, any of a variety of plastics and molding processes as commonly known in the molding art can be used to construct the guide of the present invention.

Figure 5:
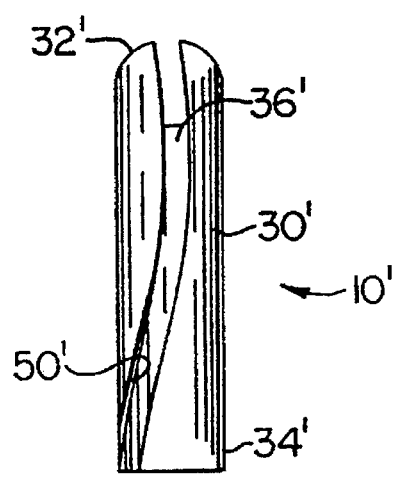
FIG. 5 is an end view of an alternative embodiment of the guide of the present invention.

With reference to FIG. 5 an alternative embodiment of guide 10' of the present invention is shown where slot 50' is gradually spiraled along sleeve 30' so that after cable portion 14 is inserted through slot 50' and is disposed in passageway 36', slot 50' will not be located above the entire length of cable portion 14. This construction prevents unintentional egress of cable portion 14 from passageway 36' in a similar manner to turn 52 and catch portion 56 of the preferred embodiment of FIGS. 1–4. While FIG. 5 shows slot 50' starting at the top of first end 32' of sleeve 30' and terminating at a point at the side of second end 34' of sleeve 30', spiraled slot 50' can be located at any position circumferentially. Additionally, slot 50' can be straight for an initial length and then curved in a circumferential direction at any point. Also in FIG. 5, sleeve 30' does not flare out at first end 32' and passageway 36' has a substantially constant cross-section. Passageway 36' is dimensioned to allow manual sliding of guide 10' along cable 12; however, the curve of guide 10' is sufficient to prevent free fall of guide 10' along cable portion 14. This embodiment of the present invention is especially suitable for location of the guide at a point along cable portion 14 away from boot 20. For example, where cable portion 14 needs to be routed around a corner at a point away from the ends of the cable, guide 10' can be readily placed on cable 12 and slid to the desired location to route cable portion 14 through a curve. If needed, guide 10' can be attached to the corner by, for example, tape or some type of snap connection.

If several cables are being routed around a corner in close proximity to each other, exterior surface 46 of sleeve 30' can be configured with some type of snap connection so that two or more sleeves 30' can be connected to each other if desired. By being able to connect two or more sleeves side by side or one over the other, space can be conserved in the routing of several cables in crowded spaces. Moreover, routing of the cables will be neater and more manageable. Alternatively, passageway 36' can be sized to allow the placement of more than one cable portion 14 so that several cables can be neatly routed through a turn in one guide.

Figure 6:
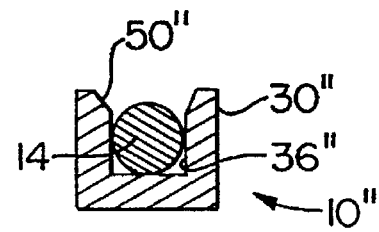
FIG. 6 is a lateral cross-section of an alternative embodiment of the guide of the present invention.

FIG. 6 illustrates an alternative embodiment of a guide of the present invention where the cross-section of sleeve 30" is generally U-shaped and the cross-section of passageway 36" is generally rectilinear. Cable portion 14 is frictionally held within passageway 36". Additionally, there is no clear demarcation between slot 50" and passageway 36" as in the C-shaped cross-section of the preferred embodiment.

Figure 7:
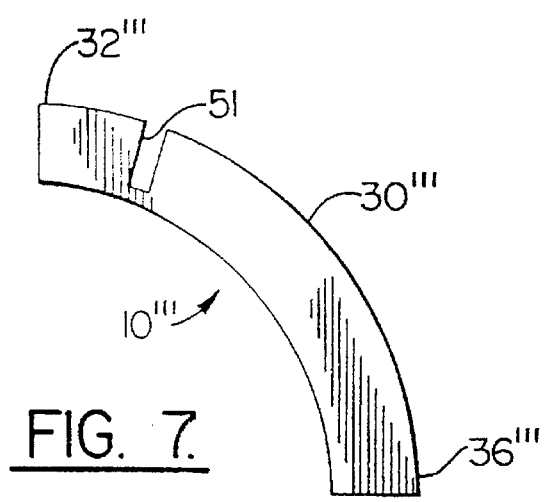
FIG. 7 is a side view of an alternative embodiment of the guide of the present invention.

FIG. 7 illustrates an alternative embodiment of guide 10''' wherein sleeve 30''' defines a transverse channel 51 to impart some additional flexibility to first end 32''' of sleeve 30''' so that first end 32''' can accommodate a larger variety of sizes of boot 20.

It should be understood that the cross-section of passageway 36 can be any shape and is not limited to circular. Furthermore, the location and configuration of slot 50 is not limited as shown but only needs to be configured to allow insertion of a length of cable portion 14 and prevent unintentional egress of cable portion 14 from passageway 36. Slot 50 can be straight yet narrow enough to contain cable 12 therein. Additionally, the outer geometry of sleeve 30 is not limited as shown but only needs to define a suitable slot 50 for insertion of cable portion 14 and define a suitable passageway 35 for placement of cable portion 14.

Although the present invention has been described with respect to a preferred embodiment and certain alternative embodiments, various changes, substitutions and modifications may be suggested to one skilled in the art and it is intended that the present invention encompass such changes, substitutions and modifications as fall within the scope of the following claims.

We claim:

1. A fiber optic cable guide for removable placement on at least one fiber optic cable, the at least one fiber optic cable having a minimum bend radius, the fiber optic cable guide comprising:

a sleeve that is at least partially curved along its length with a radius of curvature not less than the minimum bend radius of the at least one fiber optic cable, the sleeve having a first end and a second end and an interior surface that generally defines a passageway extending from the first end to the second end, the sleeve defining a slot that communicates with the passageway and extends from the first end to the second end such that the sleeve has an open cross-section along the entire length of the sleeve, the slot dimensioned to allow removable insertion of the at least one cable through the slot to be disposed in the passageway.

2. With the at least one fiber optic cable being further defined as terminating at a connector at each end and having a reinforcing boot extending from each connector so that there is a connector and boot connection at each end of the cable, the fiber optic cable guide of claim 1 wherein the slot is configured such that the sleeve can be removably placed on the at least one fiber optic cable without affecting the integrity of the connector and boot connections on the fiber optic cable.

3. The fiber optic cable guide of claim 2 wherein the cross-section of the passageway increases toward the first end of the sleeve such that after one fiber optic cable of the at least one fiber optic cable has been inserted through the slot, the first end of the sleeve can be slidably pressed over at least a portion of the reinforcing boot of the one fiber optic cable.

4. The fiber optic cable guide of claim 3 wherein the first end of the sleeve has an outwardly extending shoulder to facilitate sliding and removal of the first end of the sleeve over at least a portion of the reinforcing boot.

5. The fiber optic cable guide of claim 3 wherein the first end of the sleeve is sufficiently rigid to flex the boot in correspondence with the curve of the passageway as the first end is pressed over the boot.

6. The fiber optic cable guide of claim 1 wherein the sleeve defines cut-outs through the sleeve that are spaced along the sleeve to allow observation of the at least one fiber optic cable when disposed in the passageway.

7. The fiber optic cable guide of claim 1 wherein the slot in the sleeve turns before extending to the second end.

8. The fiber optic cable guide of claim 1 wherein the passageway is configured to allow intentional sliding of the sleeve along the at least one cable.

9. The fiber optic cable guide of claim 1 wherein the sleeve has a generally C-shaped cross-section and the passageway is sized to contain one fiber optic cable.

10. The fiber optic cable guide of claim 1 wherein the sleeve has a generally U-shaped cross-section and the passageway is dimensioned to frictionally receive a length of the at least one cable therein.

11. The fiber optic cable guide of claim 1 wherein the sleeve defines at least one channel transverse to the slot to impart additional flexibility to the sleeve.

12. A method of routing at least one fiber optic cable through a curve, the at least one fiber optic cable having a minimum bend radius, the method comprising the steps of:

(a) placing a length of the at least one fiber optic cable inside a curved sleeve that has a radius of curvature not less than the minimum bend radius of the at least one fiber optic cable, the sleeve having a first end and a second end and having an interior surface that defines a passageway that extends through the length of the sleeve from the first end to the second end, the sleeve defining a slot that communicates with the passageway and extends from the first end to the second end such that the sleeve has an open cross-section along its entire length; and (b) sliding the sleeve along the at least one fiber optic cable until the curved sleeve is located along the length of the at least one fiber optic cable that is desired to be routed through a curve.

13. With the at least one fiber optic cable being further defined as terminating at a connector at each end and having a reinforcing boot extending from each connector so that there is a connector and boot connection at each end of the cable, the method of claim 12 wherein the slot of the sleeve is configured to allow removable placement of the sleeve on the cable without affecting the integrity of the connector and boot connections.

14. The method of claim 12 wherein the cross-section of the passageway increases toward the first end of the sleeve and wherein the step of sliding the sleeve further comprises pressing the first end of the sleeve over at least a portion of the reinforcing boot of one cable.

15. The method of claim 14 wherein the step of pressing the first end of the sleeve over at least a portion of the reinforcing boot of one cable causes the boot to curve in conformance with the curve of the passageway.

16. A fiber optic cable and guide assembly comprising:

(a) a fiber optic cable having a diameter and an exterior surface, the fiber optic cable having a minimum bend radius;

(b) a guide sleeve that is removably attached about a length of the fiber optic cable, the guide sleeve at least partially curved along its length with a radius of curvature that is not less than the minimum bend radius of the fiber optic cable, the guide sleeve defining a passageway through which the cable is disposed when the guide sleeve is attached about the cable, the passageway dimensioned to allow sliding of the guide sleeve along the cable when the guide sleeve is attached about the cable the guide sleeve having a first end and a second end and having an open cross-section along the entire length of the sleeve from the first end to the second end.

17. The assembly of claim 16 wherein the fiber optic cable terminates at a connector at each end and has a reinforcing boot extending from each connector so that there is a connector and boot connection at each end of the cable, and wherein the sleeve defines a slot extending along the length of the sleeve that communicates with the passageway such that the sleeve has an open cross-section along its entire length, the slot configured to allow the sleeve to be repeatedly removed and installed to the cable without affecting the integrity of the connector and boot connections.

18. The assembly of claim 17 wherein the cross-section of the passageway increases toward the first end of the sleeve and the first end of the sleeve is removably pressed over at least a portion of the reinforcing boot of the fiber optic cable.

* * * * *